United States Patent
Lee et al.

(10) Patent No.: US 12,064,748 B2
(45) Date of Patent: Aug. 20, 2024

(54) IRON DETECTION AND REMEDIATION WITH A FUNCTIONALIZED POROUS POLYMER

(71) Applicant: The Regents of the University of California, Oakland, CA (US)

(72) Inventors: Sumin Lee, Berkeley, CA (US); Adam Uliana, Berkeley, CA (US); Jeffrey R. Long, Berkeley, CA (US); Christopher J. Chang, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 503 days.

(21) Appl. No.: 17/478,874

(22) Filed: Sep. 17, 2021

(65) Prior Publication Data

US 2022/0001357 A1     Jan. 6, 2022

Related U.S. Application Data

(63) Continuation of application No. PCT/US2020/026046, filed on Mar. 31, 2020.

(60) Provisional application No. 62/834,440, filed on Apr. 16, 2019.

(51) Int. Cl.
| | | |
|---|---|---|
| *B01J 20/26* | (2006.01) | |
| *B01J 20/30* | (2006.01) | |
| *C02F 1/28* | (2023.01) | |
| *C02F 101/20* | (2006.01) | |
| *C02F 103/06* | (2006.01) | |
| *G01N 31/22* | (2006.01) | |

(52) U.S. Cl.
CPC ......... *B01J 20/265* (2013.01); *B01J 20/3085* (2013.01); *C02F 1/285* (2013.01); *G01N 31/22* (2013.01); *C02F 2101/203* (2013.01); *C02F 2103/06* (2013.01)

(58) Field of Classification Search
None
See application file for complete search history.

(56) References Cited

PUBLICATIONS

Huang et al, Ind. Eng. Chem. Res. 2017, 56, 13696-13703 (Year: 2017).*
Zhu et al Chem. Rev. 2020, 120, 8934-8986 (Year: 2020).*

* cited by examiner

*Primary Examiner* — Krishnan S Menon
(74) *Attorney, Agent, or Firm* — Richard Aron Osman

(57) ABSTRACT

Ether-thioether functionalized porous aromatic framework (PAF) polymers provide high selectivity for iron(II) and iron(III) adsorption in aqueous samples.

15 Claims, No Drawings

IRON DETECTION AND REMEDIATION WITH A FUNCTIONALIZED POROUS POLYMER

This invention was made with government support under Grant Number GM079465 awarded by the National Institutes of Health and Grant Number DE-SC0001015 awarded by the U.S. Department of Energy. The government has certain rights in the invention.

INTRODUCTION

Iron is the fourth most abundant element in the earth's crust and the most abundant transition metal in the human body.[1] It is required for sustaining a range of physiological processes such as electron transfer, oxygen transport, respiration, and gene expression,[2-5] and iron deficiency leads to anemia.[6] However, excess iron can increase production of reactive oxygen species, resulting in oxidative stress cascades that lead to lipid oxidation and DNA damage.[2-4,7,8] Aberrant iron accumulation is implicated in aging and in several diseases, including cardiovascular diseases, neurodegenerative diseases, and cancer.[6,9-14] In this context, chronic exposure to elevated iron levels in common drinking water is a potential contributor to abnormal iron accumulation. The World Health Organization (WHO) recommends an upper limit of 0.3 mg/L for iron ions in drinking water.[15] Unfortunately, the reported iron ion concentrations in drinking water sources can vary over several orders of magnitude—for instance from 0.007 to 33.6 mg/L in West Bengal[16] or from undetectable amounts to 950 mg/L based on Groundwater Ambient Monitoring and Assessment data from the San Francisco Bay (see Supporting Information). Because traditional methods for iron(II) and iron(III) detection require expensive instrumentation, such as inductively coupled plasma mass spectrometry or atomic absorption spec-troscopy,[17,18] it remains a challenge to rapidly and inexpensively screen drinking water for quantities of iron and other metal ion contaminants, particularly in developing countries and other lower-resource environments.[11,16,17,19-24]

To meet this challenge, we sought to develop a chemical strategy that would enable simultaneous detection and removal of both iron(II) and iron(III) ions from drinking water and other environmental and biomedical samples, with high selectivity over other metal ion contaminants. In particular, we envisioned a robust, molecularly-tailored solid-state adsorbent that would efficiently capture and remove iron ions from a complex water sample obtained in the field while also permitting a quantitative measure of the iron concentration. We chose to investigate porous aromatic frameworks (PAFs) for this dual remediation and quantitative detection function, owing to their high chemical and thermal stability—particularly in aqueous and biological samples—and because of their ability to be functionalized in a. molecular fashion.[25-37] The polymer PAF-1 is one such material that exhibits a high Brunauer-Emmett-Teller (BET) surface area[38] of up to 5600 m$^2$/g and is readily functionalized through post-synthetic modification.[38-43] Indeed, we recently reported a thioether-functionalized variant of this porous polymer, PAF-1-Sme, as a platform for selective copper ion capture from biofluid samples, ultimately as a diagnostic tool for Wilson's disease.[42]

In US20180024112 we disclosed functionalizing PAFs with (2-methoxyethyl)(methyl)sulfane to obtain ((2-methoxyethyl)thio)methyl-PAF polymers with high affinity for Cu, Here we disclose that by inverting the linker we obtain (2-(methylthio)ethoxy)methyl-PAF polymers with high affinity for Fe.

Here, we present the synthesis of an iron-selective porous polymer via ether-thioether (ET) functionalization of PAF-1. The polymer PAF-1-ET exhibits highly selective iron(II) and iron(III) ion uptake over competing metal ions in laboratory and. field water samples. The combination of this polymer with 8-hydroxyquinoline indicator enables rapid and quantitative monitoring of iron levels with a simple colorimetric assay. We highlight the potential utility of this method for remediation and screening of synthetic groundwater as well as field samples of drinking water collected from West Bengal, India. This work provides new porous polymers for simplified, accurate, and rapid diagnostic and remediation applications without the need for bulky and expensive instrumentation.

SUMMARY OF THE INVENTION

We previously reported a thioether-functionalized variant of the porous polymer, PAF-1-Sme, as a platform for selective copper ion capture from biofluid samples. (J. Am. Chem. Soc., 2016, 138 (24), 7603-7609); see also: US20180024112. in this work we disclose novel polymers via ether-thioether (ET) functionalization, and found that the resulting materials exhibit highly selective iron(III) and iron(III) ion uptake over competing metal ions in laboratory and field water samples.

Ether/thioether functionalized porous aromatic framework (PAF-1-ET) polymers with high selectivity for iron(II) and iron(III) adsorption in aqueous samples are disclosed. Mössbauer, XANES, and EXAFS measurements support iron(III) coordination to oxygen-based ligands within the materials. The polymers are successfully employed to adsorb and remove iron ions from authentic groundwater samples. Combined with an 8-hydroxyquinoline colorimetric indicator, the polymers enable simple and direct determination of the iron(II) and iron(III) ion concentrations in groundwater samples.

The material described in this invention can be used to remove potentially toxic iron from contaminated waters with high efficiency and selectivity in the presence of many other common competing species. Iron is the fourth most abundant element in the earth's crust and is therefore often present naturally in drinking water at significantly high levels unsafe for consumption. Thus, this invention is useful to produce materials for water treatment applications, in addition to remove iron from water. The material can be used in a packed adsorption column, as a free-standing material, or as a filler in composite polymer membranes for membrane separation applications. For example, residents who consume groundwater from wells in areas with high iron levels could use this invention for point-of-use water treatment.

In an aspect the invention provides an ether-thioether functionalized porous aromatic framework (PAF-1-ET) polymer with selectivity for iron(II) and iron(III) adsorption in aqueous samples.

In embodiments:
the PAF is of formula: (2-(methylthio)ethoxy)methyl-PAF ($CH_3SCH_2CH_2OCH_2$-PAF or PAF-$CH_2OCH_2CH_2SCH_3$);
the PAF comprises carbon atoms tetrahedrally connected to four neighboring carbon atoms though two phenyl rings;
the PAF comprises monomer units of one of formulas (I), (II (III) or (IV):

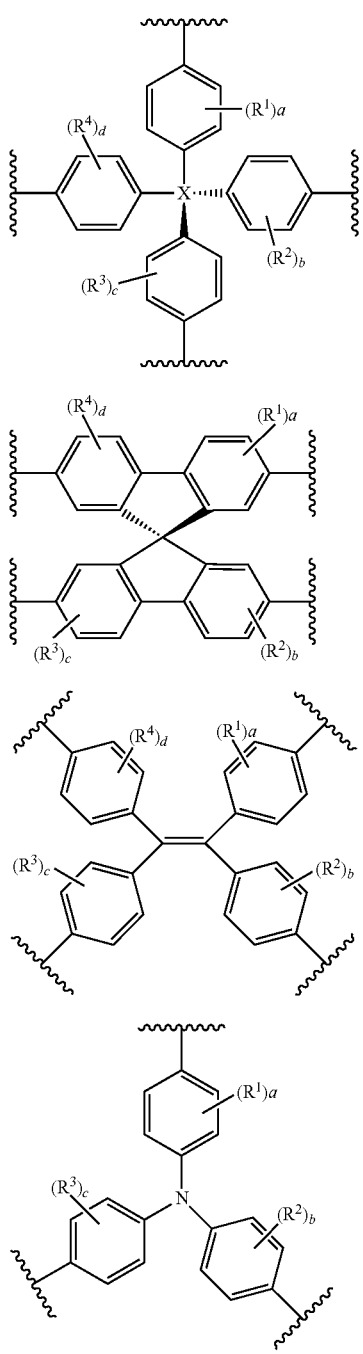

wherein,

X is selected from C, Si, and a three-dimensional polycyclic cycloalkyl moiety.

$R^1$; $R^2$, $R^3$ and $R^4$ are independently selected from an ether-thioether, and the indeces a, b, c and d are members independently selected from the integers 0, 1, 2, 3, and 4, such that when a, b, c, or d is greater than 1, each $R^1$, $R^2$, $R^3$ and $R^4$, respectively, is independently selected;

the polymer is synthesizable using a nickel(0)-catalyzed Yamamoto-type Ullmann cross-coupling reaction to couple the phenyl rings to a tetrakis(4-bromophenyl)methane a tetrahedral building unit; and/or the polymer exhibits selectivity for the adsorption of iron(II) and iron(III) ions over other biologically-relevant metal ions at initial concentrations of 0.3. 2, 10 or 20 mg/L, for example, the distribution coefficient, $K_d$, for 10 mg/L iron(H) in pH=6,7 HEPES buffer is over an order of magnitude greater than the $K_d$ values for 10 mg/L of $Na^+$, $K^+$, $Mg^{2+}$, $Ca^{2+}$, $Cu^{2+}$, and $Zn^{2+}$.

In an aspect the invention provides a composition comprising a subject polymer combined with an 8-hydroxyquinoline colorimetric indicator.

The invention provides methods of making and using the disclosed polymers. In an aspect the invention provides a method of making a subject polymer comprising the step of reacting PAF-1-$CH_2Cl$ with 2-(methylthio)ethan-1-ol to obtain the PAF-1-ET.

In an aspect the invention provides a method of using a subject polymer comprising absorbing to the polymer iron ions from a water sample.

In an aspect the invention provides a method of detecting iron in a sample comprising absorbing to a subject polymer iron ions of the sample.

In an aspect the invention provides a method of removing iron from a sample comprising absorbing to a subject polymer iron ions of the sample, and separating the iron ions from the sample.

The invention encompasses all combinations of the particular embodiments recited herein, as if each combination had been laboriously recited, such as wherein

DESCRIPTION OF PARTICULAR
EMBODIMENTS AND DELIVERY METHODS
OF THE INVENTION

Unless contraindicated or noted otherwise, in these descriptions and throughout this specification, the terms "a" and "an" mean one or more, the term "or" means and/or. The examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein, including citations therein, are hereby incorporated by reference in their entirety for all purposes.

PAF polymers are characterized by a rigid three-dimensional framework of aromatic rings, built up by polymerization of one monomer or copolymerization of more than one monomer. Typical reactions are C—C coupling reactions or addition reactions under ring formation conditions. In various embodiments, the porous aromatic covalent framework polymer is characterized in that the polymer comprises at least a first aryl or heteroaryl monomer unit and at least a second aryl or heteroaryl monomer unit. The first and second monomer units each have different structures. Exemplary aryl or heteroaryl ring components of the first and second monomer are selected from phenyl, naphthyl, biphenyl, pyridyl, pyrimidinyl, pyridazinyl, pyrazinyl and triazinyl. The aryl and heteroaryl rings of the first monomer and the second monomer are independently selected, and they are optionally substituted at positions other than those positions through which polymerization to form the framework occurs.

Example: Iron Detection and Remediation with a
Functionalized Porous Polymer Applied to
Environmental Water Samples Iron is one of the most abundant elements in the environment and in the human body. As an essential nutrient, iron homeostasis is tightly regulated, and iron dysregulation is implicated in numerous pathologies, including neurodegenerative diseases, atherosclerosis, and diabetes. Endogenous iron pool concentrations are directly linked to iron ion uptake from environmental sources such as drinking water, providing motivation for developing new technologies for assessing iron(II) and iron(III) levels in water. However, conventional methods for measuring aqueous iron pools remain laborious and costly and often require sophisticated equipment and/or additional processing steps to remove the iron ions from the original environmental source. We report a simplified and accurate chemical platform for capturing and quantifying the iron present in aqueous samples through use of a post-synthetically modified porous aromatic framework (PAF). The ether/thioether-functionalized network polymer, PAF-1-ET, exhibits high selectivity for the uptake of iron(II) and iron(III) over other physiologically and environmentally relevant metal ions. Mössbauer spectroscopy, XANES, and EXAFS measurements provide evidence to support iron(III) coordination to oxygen-based ligands within the material. The polymer is further successfully employed to adsorb and remove iron ions from groundwater, including field sources in West Bengal, India, Combined with an 8-hydroxyquinoline colorimetric indicator, PAF-1-ET enables the simple and direct determination of the iron(II) and iron(III) ion concentrations in these samples, providing for the design and use of molecularly-functionalized porous materials for potential dual detection and remediation applications.

General Methods

All reactions were performed under a nitrogen or argon atmosphere and in dry solvents, unless otherwise stated. Tetrakis(4-bromophenyl)methane was purchased from ICI America as a pale yellow powder. All other starting materials and reagents were purchased from Sigma-Aldrich. Nitrogen adsorption isotherms were measured using a Micromeritics ASAP 2020 or 2420 instrument. Samples were transferred to a pre-weighed glass analysis tube that was capped with a Transeal and then evacuated on the ASAP until the outgas rate was less than 3 μbar/min. Ultrahigh-purity grade (99.999%) nitrogen was used for gas adsorption measurements. Nitrogen isotherms were obtained using a 77 K liquid-$N_2$ bath and were used to determine the surface areas and pore volumes using the Micromeritics software, assuming a value of 16.2. $Å^2$ for the molecular cross-sectional area of $N_2$. Infrared spectra were obtained on a Perkin-Elmer Spectrum 100 Optica FTIR spectrometer furnished with an attenuated total reflectance accessory. Thermal gravimetric analysis data were collected at a ramp rate of 5° C./min under flowing nitrogen using a TA Instruments TGA Q5000. Scanning electron microscopy (SEM) samples were prepared by dispersing fine polymer powders into methanol and drop casting onto silicon chips. To dissipate charge, the samples were sputter coated with approximately 3 nm of Au (Denton Vacuum). Polymers were imaged at 5 keV and 12 μA by field emission SEM (JEOL FSM6430). Elemental analyses (C, H, N, S) were obtained from the Microanalytical Laboratory at the University of California, Berkeley. Elemental analysis for chlorine was performed at Galbraith Laboratories. UV-Vis spectroscopic measurements were performed in 100 mM HEPES buffer (pH 6.7). Absorption spectra were recorded using a Varian Cary 50 spectrophotometer, and samples for absorption measurements were prepared in 1×0.5 cm quartz cuvettes (1.4-mL, Starna). Inductively coupled plasma-mass spectrometry (ICP-MS) was performed on samples that had been diluted into 2% nitric acid (made freshly from concentrated nitric acid [BDH Aristar Ultra] and Milli-Q water) containing 20 μg/L Ga internal standard (Inorganic Ventures, Christiansburg, VA). The samples were analyzed on a Thermal slier iCAP-Qc ICP-MS in Kinetic Energy Discrimination mode against a calibration curve of known metal concentrations (made from CMS-5, Inorganic Ventures, Christiansburg, VA), Low-temperature X-band EPR spectra were recorded using a Varian El 09 EPR spectrometer equipped with a Model 102 microwave bridge. Sample temperature was maintained at 8 K by using an Air Products LTR liquid helium cryostat. The following spectrometer conditions were used: microwave frequency, 9.22 GHz; field modulation amplitude, 32 G at 100 kHz, and a microwave power of 20 mW.

Synthesis of PAF-1-ET 2-(methylthio)ethan-1-ol (1.83 mL, 0021 mol) and 3 equiv. of NaH (1.5 g, 0.063 mol) were mixed with toluene (100 mL) in a 250 mL Schlenk flask under $N_2$. After 5 min, freshly-prepared PAF-1-$CH_2Cl$ (260 mg, see the Supporting Information) was added, and the mixture was stirred at 90° C. for 3 days. The resulting solid was collected, washed sequentially with 100 mL each of $H_2O$, ethanol, $CHCl_3$, and THF, and dried in a vacuum oven at 150° C. to produce PAF-1-ET as an off-white powder. Calc. for $C_{32.5}H_{34}O_2S_2$ (%): C 74.96, H 6.58, S 12.31, Cl 0.00; observed: C 74.89, H 5.08, 5 5.50, Cl 1.97. Based on the sulfur elemental analysis, this preparation resulted in 45% substitution with 2-(methylthio)ethan-1-ol.§

Solid-state $^{13}C$ NMR

NMR sample preparation. Samples of PAF-1 -ET (35 mg) and PAF-1-$CH_2Cl$ (20 mg) were dried at 100° C. for 3 h before data collection. Iron(III)-loaded PAF-1-ET was prepared by stifling PAF-1-ET (50 mg) at room temperature overnight in a solution of $FeCl_3$ (10 mL, 100 mg/L) dissolved in 100 mM HEPES buffer (pH=6.7) with 2 equiv, of citric acid. The filtered iron(III)-PAF-1-ET was washed with Milli-Q $H_2O$, ethanol, dichloromethane, and THE (50 mL each) and dried at 100 ° C. for 3 h before data collection.

NMR Experiments

All experiments were conducted at a $^{13}C$ frequency of 75.5 MHz using a Tecmag Discovery spectrometer equipped with a 7.05 T magnet and a Chemagnetics 4 mm HX CP/1\4AS probe (magic-angle spinning rate of 10 kHz). Cross-polarization from $^1H$ was used when acquiring spectra for PAF-1-$CH_2Cl$ and PAF-1-ET. The Hartmann-Hahn condition[43] for cross-polarization experiments was obtained on solid adamantane, which is also a secondary $^{13}C$ chemical shift reference (the methylene signal of adamantane was set to 38.48 ppm relative to TMS). The PAF-1-$CH_2Cl$ spectrum was collected using a CP contact time of 10 ms and a pulse delay of 4 s. A two-pulse phase modulation (TPPM) proton decoupling scheme was used, with a TPPM angle of 15 degrees and decoupling field strength of ~60 kHz, The spectrum for PAF-1-ET was obtained using a contact time of 1 ms and a pulse delay of 4 s. Direct polarization s pulse delay) was used to collect the spectrum for iron(III)-loaded PAF-1-ET. Continuous wave proton decoupling was used for both the PAF-1-ET and iron(III)-PAF-1-ET spectra, with a decoupling field strength of ~60 kHz.

Metal Ion Adsorption in PAF-1-ET

Iron adsorption measurements. Samples of PAF-1-ET (2.0 mg) were added to conical tubes containing 5 mL of $(NH_4)_2Fe(SO_4)_2 \cdot 6\ H_2O$ (dissolved in 100 mM HEPES buffer, pH 6.7) with concentrations ranging from $10^{-3}$-240 mg/L. Each mixture was capped under air and stored in a shaker at room temperature overnight. Each solution was subsequently filtered through a 0.45-μm membrane filter, and the filtrates were analyzed by ICP-MS to determine the residual iron content. Iron uptake (initial-residual iron concentration) data was fit using a Langmuir model given by:

$$q_e = q_{sat} K_L C_e / 1 + K_L C_e$$

where $q_e$ is the adsorption capacity (mg/g), $C_e$ is the equilibrium iron ion concentration (mg/L), $q_{sat}$ is the adsorption saturation capacity (mg/g), and $K_L$ is the Langmuir constant (L/mg), which is related to the binding affinity of the adsorption site.

Metal ion adsorption selectivity studies. Samples of PAF-1-ET (2 mg) were added to conical tubes containing aqueous solutions of NaCl, KCl, $MgCl_2$, $CaCl_2$, $MnCl_2$, $(NH_4)_2Fe(SO_4)_2 \cdot 6\ H_2O$, $FeCl_2$, $CoCl_2$, $NiCl_2$, $CuCl_2$, or $ZnCl_2$ at initial concentrations of 0.3, 2, or 20 mg/L in 100 mM HUES buffer (pH 6.7). Iron(II) samples were prepared and stored under anaerobic conditions until analysis by ICP-MS. In the case of iron(III), one equivalent of citric acid was also added to the samples to prevent $Fe(OH)_3$ precipitation. The slurries were stored in a shaker at room temperature overnight and then filtered through a 0.45-μm membrane. The filtrates were analyzed using ICP-MS, and the amount of metal ion adsorbed was calculated by subtracting the residual iron concentration from the initial iron concentration. The distribution coefficient, $K_d$, for each metal ion was determined as described in Section 3 of the Supporting Information.

Iron Adsorption Kinetics

An Erlenmeyer flask containing 2 mg of PAF-1-ET was charged with a solution of $(NH_4)_2Fe(SO_4)_2 \cdot 6\ H_2O$ (10 mL, 10.2 ppm) in 100 mM HEPES buffer (pH 6.7) and 1 equiv. of citric acid. The mixture was stirred at room temperature for 8 h. During this period, aliquots of the mixture were filtered at intervals through a 0.45-μm membrane. The filtrates were analyzed using ICP-MS to determine the iron ion concentration. The amount of iron adsorbed by PAF-1-ET was calculated by subtracting the residual from the initial iron concentration. The adsorption data were fit with the pseudo-second-order kinetic model:

$$t/q = 1/kq_e^2 + t/q_e$$

where k is the pseudo-second-order rate constant (g/(mg min)) and $q_e$ is the amount of iron adsorbed at equilibrium (mg/g).

Mössbauer Experiments

A sample of PAF-1-ET (~50 mg) was added to an aqueous solution of $^{57}FeCl_3$ (50 mg/L, see the Supporting Information), and the mixture was stirred overnight at room temperature under $N_2$. The resulting $^{57}Fe(M)$-loaded PAF-1-ET was collected, washed with warm $H_2O$ (100 mL) and. $CHCl_3$ (100 mL), and then dried in a vacuum oven at 150° C. to yield a white powder. Mössbauer spectra. were obtained between 5 and 300 K with a SEE Co. Mössbauer spectrometer equipped with a Co-57 source in Rh matrix. Reported isomer shifts are given relative to α-iron at 295 K. The spectral absorber was prepared in air by packing the sample into a 1.27 cm diameter Nylon washer before transferring to the spectrometer, where the absorber was always maintained under a He atmosphere. See the Supporting Information (Section 6) for full measurement details.

X-ray Absorption Measurements

X-ray absorption spectra were collected at the Stanford synchrotron radiation light source on beamline 9-3 with ring storage conditions of 3.0 GeV and 500 mA. The iron K-edge absorption spectra of the PAF samples, packed in 0.5 mm thick aluminum sample holders with Kapton film windows, were recorded at room temperature. Reference compounds were analyzed after dilution with boron nitride. The spectral data were collected in transmission mode for Fe, $Fe_2O_3$, and FeO and in fluorescence mode for PAF-1-ET with a 100-element Ge monolithic solid-state detector from Canberra. The incident radiation was monochromatized using a Si(220) double crystal monochromator, which was detuned to 50% of flux maximum at the iron K-edge to minimize the higher harmonics and reduce X-ray flux. A harmonic rejection mirror was used to further reduce the contamination from higher harmonics radiation. The incident and transmitted X-ray intensities were monitored with $N_2$-filled ion chambers. An iron foil spectrum was concomitantly recorded for energy calibration where the first inflection point was assigned to 7111.2 eV. Even at the low X-ray flux density used, a slight photoreduction of PAF-1-ET was observed even after two scans at a given sample position. As a consequence, the spectral data were collected at multiple spots, and only the first two scans at each position were used for averaging the spectral data over multiple positions Data reduction was carried out with the SamView software obtained from Sixpack software. Athena software, Demeter version 0.9.25[45] was used for data averaging and removal of the pre-edge and post-edge background absorption. .A five-domain cubic spline was used to remove low-frequency background in k-space. The resulting k-space data, as $k^3 \chi(k)$, was then Fourier transformed into r-space over a k range of 3.46 to 10.52 Å$^{-1}$ and used for the extended X-ray absorption fine structure (EXAFS) refinement. The EXAFS fitting was carried out using the Artemis software[45] with phase and amplitude functions obtained from FEFF, version 6.[46] The average bond distance between the iron and scattering atom (R) and the mean square displacement of the bond distance ($\sigma^2$) were allowed to vary, while N the number of atoms in the shell, was systematically varied in integral steps. The value of $E_0$, the energy of the zero value of the photoelectron wave vector k, was also varied but constrained to a common value for every shell in a given fit. The value for $S_0^2$, the amplitude reduction factor, was extracted from the fit of the Fe foil data and was fixed at 0.95 during all other fits.

Results and Discussion: Synthesis and Characterization

Building upon the design of the thioether-functionalized polymer PAF-1-SMe for selective copper ion capture[42] and the related PAF-1-SH for mercury ion adsorption,[40] we synthesized a variety of PAF-1 derivative scaffolds. Subsequent testing for metal ion uptake from aqueous solutions showed that the variant with an extended ether-thioether pendant, referred to here as PAF-1-ET, is an effective material for selective capture of both iron(II) and iron(III). This work complements our recent efforts to develop activity-based fluorescent probes for iron(II).[47-52]

The polymer PA E-1-ET was synthesized in three steps, starting with the synthesis of parent PAF-1 and PAF-1-$CH_2Cl$ (see the Supporting Information)[40] followed by treatment of the latter with 2-(methylthio)ethan-1-ol to yield PAF-1-ET. Elemental analysis revealed a decrease in chlorine content from 13.60% in PAF-1-$CH_2Cl$ to 1.97±1.5% in PAF-1-ET, and the sulfur content of the latter was found to be 5.50+0.82%—corresponding to grafting of 45±6.7% of the phenyl groups in PAF-1-ET or a loading of 1.7 mmol/g. In the IR spectrum of PAF-1-ET, the absence of a peak at 1270 cm (assigned to the C—H wagging mode of —$CH_2Cl$ in PAF-1-$CH_2Cl$) further confirmed functionalization. Solid-state $^1H$—$^{13}C$ cross-polarization magic angle spinning NMR spectroscopy revealed new $^{13}C$ chemical shifts at 73, 48, 39, and 17 ppm for PAF-1-ET, arising from the ether-thioether groups, and the absence of a shift at 43 ppm corresponding to the $CH_2Cl$ groups of PAF-1-$CH_2Cl$. Nitrogen adsorption isotherms obtained at 77 K revealed that PAF-1-ET retains permanent porosity with a high BET surface area of 1500±420 $m^2/g$. The average pore size distribution obtained from the adsorption isotherms was found to be <10 Å for PAF-1-ET, which is smaller than the average value of 12 Å for PAF-1. and supports incorporation of the ether-thioether groups.

Selectivity and Kinetics of Iron Uptake

Equilibrium iron(III) isothermal adsorption data were collected for PAF-1-ET and PAF-1-$CH_2Cl$ over aqueous ion concentrations ranging from 1 μg/L to 300 mg/L, and these data were fit using the Langmuir model [29] to assess framework saturation capacities and binding affinities for iron(III). Notably, PAF-1-ET exhibited much higher iron(III) uptake than PAF-1-$CH_2Cl$ over the entire concentration range and a binding affinity twice that of PAF-1-$CH_2Cl$. At saturation, the maximum adsorption capacity ($q_{sat}$) of PAF-1-ET was found to be 105(4) mg/g, which corresponds to an uptake of 1.8 mmol of iron(III) per gram of material nearly three times the capacity of PAT-1-$CH_2Cl$ (37(2) mg/g). Based on the maximum adsorption capacity of PAF-1-ET, the ET:iron ratio is at least 1.1. We also collected adsorption data using iron(III) chloride, iron(III) sulfate hydrate, or ammonium iron(III) citrate to investigate the effect of the counterion on iron uptake in PAF-1-ET. For all salts, PAF-1-ET showed comparable iron uptake at low and high iron concentrations (see the Supporting Information, Section 4).

Importantly, PAF-1-ET also exhibited high selectivity for the adsorption of iron(II) and iron(III) ions over other biologically-relevant metal ions at initial concentrations of 0.3, 2, and 20 mg/L. For example, the distribution coefficient, $K_d$, for 10 mg/L iron(II) in pH=6.7 :HEPES buffer was found to be 2.6(7)×$10^4$ mL/g, over an order of magnitude greater than the $K_d$ values for 10 mg/L of $Na^+$, $K^+$, $Mg^{2+}$, $Ca^{2+}$, $Cu^{2+}$, and $Zn^{2+}$ (600, 120, 180, 770, 3300, and 38 mL/g, respectively). Given this exceptional performance, PAF-1-ET should be useful for iron capture from a variety of water samples.

The concentration dependence of iron(III) uptake by PAF-1-ET was also evaluated by examining various pH 6.7 aqueous solutions in HEPES buffer, and it was found that the adsorbed amount increases with increasing ion concentration in solution. In order to develop a colorimetric assay for detection of the adsorbed iron(III), we evaluated the ability of 8-hydroxyquinoline to bind iron(III) captured within the porous framework. Upon binding free iron(III), 8-hydroxyquinoline undergoes a distinct change from colorless (315 nm absorption, ε=1.95×$10^3$ $M^{-1}$ $cm^{-1}$) to blue-green (460 and 560 nm absorption, ε=750 $M^{-1}$ $cm^{-1}$ at 460 nm), which is distinctive of an iron(III) 8-hydroxyquinoline complex.[53-56] Thus, successful binding of iron(III) within PAF-1-ET by 8-hydroxyquinoline should permit a facile and quantitative determination of the quantity adsorbed. To confirm this capability, a 1 MM. solution of 8-hydroxyquinoline in dimethyl sulfoxide was added to dried samples of PAF-1-ET that had been exposed to the aqueous iron samples. Gratifyingly, in the presence of these samples, the 8-hydroxyquinoline absorption spectra exhibited two new peaks at 460 and 560 nm, indicative of iron(III) complex formation, The calculated amount of iron(III) adsorbed by PAF-1-ET based on the 460 nm absorbance peak for the highest sample concentration correlated well with amounts determined directly via ICP-MS.

Spectroscopic Characterization.

To obtain additional insight into the nature of the interactions between adsorbed iron(III) and the framework functional groups, $^{57}Fe$ Mossbauer spectra were collected between 5 and 300 K. At all temperatures, the spectral fits indicated the predominant presence of paramagnetic, high-spin iron(III) adsorbed within PAF-1-ET, with no evidence of long-range magnetic order. A small constrained component (9% by area) was also present in all data, likely due to residual high-spin iron(II) from sample preparation. The spectra. were found to be very similar between 50 and 300 K, with a predominant bimodal distribution of quadrupole splittings, $\Delta E_Q$, between 0.6 and 1.0 mm/s, centered about a unique high-spin iron(III) isomer shift, δ, of 0.385(2) mm/s at 300 K (0.507(1) mm/s at 50 K), These values are consistent with an iron(III) ion residing in a pseudooctahedral coordination with a distribution of near-neighbor oxygen environments, a conclusion that is consistent with the extended X-ray absorption fine structure (EXAFS) data below. Interestingly, upon cooling to 20 K and below, some of the highly dispersed iron(Ill) ions adsorbed in PAF-1-ET exhibited initial evidence for slow paramagnetic relaxation on the Mossbauer timescale s), with predominant hyperfine fields of 45 T (17.6(6)% area), 46.6(1) T (50.4(6)% area), and 46.6(1) T (58.8(4)% area), respectively.

Iron K-edge X-ray absorption spectroscopy was used to investigate the local coordination environment of the adsorbed iron, For iron(III) adsorbed PAF-1-ET,[57] the best two-shell fit was achieved with a coordination environment of six oxygen atoms at a distance of 2.00(1) Å and 12 carbon atoms at a. distance of 3.06(4) Å, We also obtained the $^{13}C$ NMR spectrum of iron(III)-loaded PAF-1-ET to compare with that of PAF-1-ET. The coordination of paramagnetic iron(III) resulted in severe peak broadening in addition to an overall shift in the peaks observed for PAF-1-ET.[58-60] The benzene ring resonances between 148-132 ppm for PAF-1-ET shifted to 147-140 ppm in the spectrum of iron(III)-loaded PAF-1-ET, and all peaks corresponding to the ET functional groups of PAF-1-ET (73, 48, 39, and 17 ppm) shifted upfield in iron(Ill)-loaded PAF-1-ET (to ~34-5 ppm). The more dramatic shift in the ether-thioether peaks provides additional evidence that this group is indeed bound to iron(III).

Iron Coordination in PAF-1-ET

To investigate possible iron coordination environments within PAF-1-ET, we used the program *Materials Studio* to generate a hypothetical portion of the PAF-1-ET structure, featuring one iron ion within a single diamond net, Based on the EXAFS data, it was assumed that a total of six oxygen atoms and no sulfur atoms coordinate to the iron. A monodentate sulfate anion was always included at one of the coordination sites for charge balance, and the remaining sites were coordinated by water and the El oxygen atoms. The modeling revealed that up to three oxygen atoms from three different functional groups (ET:Fe=2.9) can coordinate to the same iron ion at the low loading observed for genuine groundwater samples, provided that these groups are located at the 2-, 2'-, and 3-positions of two adjacent biphenyl groups. Importantly, the modeling also showed that the ET group flexibility may enable two groups to bind the same iron ion, regardless of their respective positions on a biphenyl unit. Based on the maximum iron(III) adsorption capacity data, for high iron loading (ET:Fe=1.1), it is presumed that only a single ET group can bind to the iron. In this case, a coordinated water molecule might participate in a weak CH-π interaction with a benzene ring that stabilizes the iron ions, a hypothesis supported by the benzene ring shift in the $^{13}C$ NMR spectrum of iron(III)-loaded PAF-1-ET.

To investigate the importance of the ether-thioether orientation and pore environment in PAF-1-ET for iron(III) uptake, we prepared a series of related porous polymers and evaluated their iron adsorption properties. The first of these polymers, PAF-1-TE, was synthesized from PAIL 1 -$CH_2Cl$ using 2-methoxyethane-1-thiol, yielding a material analogous to PAF-1-ET but featuring interchanged positions for the pendant oxygen and sulfur moieties. We also prepared ether-functionalized porous polymers PAF-1-OMe and -Ethoxy and a linear polysulfone polymer functionalized with the ether-thioether ligand, PSF-ET. When exposed to a solution of $FeCl_3$ (20 mg/L) dissolved in 100 mM HEPES buffer (pH=6.7) with one equivalent of citric acid, each of the derivative polymers exhibited significantly lower iron (III) uptake than PAF-1-ET. The much lower uptake of PAF-1-TE, -OMe, and -Ethoxy suggests that both the position of oxygen and the presence of sulfur are crucial for iron adsorption, while the low uptake of PSF-ET emphasizes the importance of a compact pore environment in tandem with the ET functionality.

Iron Capture and Detection in Synthetic and Environmental Water Samples

To verify the detection capability of PAF-1-ET when exposed to iron(III) sources from different regions, synthetic groundwater was prepared according to the Gadgil[61] procedure with iron(III) concentrations of 1.8, 4.7, 6.7, and 37 mg/L. The polymer was also used to treat genuine groundwater samples collected in West Bengal, India, reported to contain 14 mg/L of iron(III) ions.[16] Notably, PAF-1-ET adsorbed between ~41 and 91% of the iron(III) in the synthetic groundwater samples, from initial concentrations between 37 and 1.8 mg/L, respectively. In the presence of PAF-1-ET, the concentration of iron(III) in the genuine groundwater decreased with time as given by the expression $y=Ae^{-t/t_0}+C$, where y is the detected amount of iron(III), A is a scale factor, C is a constant, $t_0$ is the decay time, and t is the elapsed time. The best fit corresponds to A=9.2(3) mg/L, C=4.1(1) mg/L, and $t_0$=12(1) min. In other words, within 24 min PAF-1-ET captured 72% of the iron(III) ions and was essentially saturated after ~36 min, such that the iron(III) concentration in the genuine groundwater reached a constant value of ~3.92 mg/L.

The final concentration in the genuine groundwater sample is higher than that recommended for safe drinking water by the WHO (0.3 mg/L), and the same is true for the synthetic groundwater solution with an initial concentration of 37 mg/L. However, the saturation capacity of PAF-1-ET suggests that the framework is capable of reducing the iron(III) content in both these solutions to levels lower than 0.3 mg/L. It is likely that at higher iron(III) concentrations, precipitation of $Fe(OH)_3$ within the pores blocks some of the accessible coordination sites and reduces the effective capacity. Even still, PAF-1-ET functions exceptionally well in the removal of iron from solutions with relatively low initial concentrations indeed, the framework was able to reduce the iron(Ill) ion content to safe thinking levels for solutions with initial iron concentrations of 1,8. 4,7, and 6,7 mg/L. For the effective treatment of water containing higher iron ion concentrations, it may be necessary to use larger quantities of citric acid to prevent $Fe(OH)_3$ precipitation, Analysis of the PAF-1-ET samples using an 8-hydroxyquinoline assay revealed an increase in absorbance at 460 and 560 nm with increasing iron(III) concentration, as associated with the original water samples. The iron(III) concentrations calculated from the absorption at 460 nm were again in good agreement with those determined from direct ICP-MS measurements. Finally, using the three-sigma method (3 σ/k)[62-64] the iron(III) detection limit for the PAF-1-ET and 8-hydroxyquinoline assay was determined to be 150 μg/L, Importantly, PAF-1-ET retains structural integrity and porosity following the addition of 8-hydroxyquinoline and can be cycled at least three times without noticeable loss of adsorption capacity,

Conclusions

We have demonstrated that the ether-thioether-functionalized porous aromatic framework PAF-1-ET is capable of selective and efficient iron ion uptake and removal from both synthetic water and environmental groundwater. In this material, captured iron(III) is preferentially bound by oxygen in a pseudooctahedral coordination environment, as confirmed by Mössbauer and X-ray absorption spectroscopy characterization. The introduction of oxygen functionality within the framework is thus responsible for a shift to iron ion selectivity from our previously reported copper-selective thioether-functionalized material, PAF-1-SMe.[42] Finally, the combination of PAF-1-ET with 8-hydroxyquinoline as a colorimetric indicator provides an efficient and accurate tool for directly determining the iron ion concentrations from groundwater samples, with minimal processing and equipment needs.

REFERENCES

1 K. A. Weber, A. Achenbach, and J. D. Coates, *Nat. Rev. Microbiol.*, 2006, 4, 752.
2 M. W. Hentze, M. U. Muckenthaler, N. C. Andrews, *Cell*, 2004, 117, 285.
3 S. J. Dixon, B. R. Stockwell, *Nat. Chem. Biol.*, 2014, 10, 9.
4 C. J. Chang, *Nat. Chem. Biol.*, 2015, 11, 744.
5 B. Spangler, C. W. Morgan, S. D. Fontaine, M. N. Vander Wal, C. J. Chang, J. A. Wells, A. R. Renslo, *Nat. Chem. Biol.*, 2016, 12 680.
6 M. C. Kew, *Liver Cancer,* 2014, 3, 31.
7 E. C. Theil, D. J. Goss, *Chem. Rev.,* 2009, 109, 4568.
8 T. Kurz, J. W. Eaton, U. T. Brunk, Int. *Biochem. Cell Biol.* 2011, 43, 1686.

9 J. T. Salonen, K. Nyyssönen, Korpela, J. Tuomilehto, R. Seppanen, R. Salonen, *Circulation,* 1992, 86, 803.

10 S. Martins, S. Logan, R. E. Gilbert, Iron Therapy for Improving Psychomotor Development and Cognitive Function in Children under the Age of Three with Iron Deficiency Anaemia, In Cochrane Database of Systematic Reviews; The Cochrane Collaboration, Ed.; John Wiley & Sons, Ltd: Chichester, UK, 2001.

11 J. Carrier, E. Aghdassi, J. Cullen, J. P. Allard, *J. Nutr.,* 2002, 132, 3146.

12 B. Arezzi.ni., B. Lunghi, G. Lungarella, C. Gardi, *Int. J. Biochem. Cell Biol.,* 2003, 35, 486.

13 A. V. Hoftbrand, A. Cohen, C. Hershko, *Blood,* 2003, 102, 17.

14 G. J. Brewer, *Chem. Res. Toxicol.,* 2010, 23, 319.

15 World Health Organization, *World Health Organ. Guidel.,* 2003, 2, 1.

16 S. E. Amrose, S. R. S. Bandaru, C. Delaire, C. M. van Genuch-ten, A. Dutta, A. DebSarkar, C. Orr, J. Roy, A. Das, A. J. Gadgil, *Sci. Total Environ.,* 2014, 488-489, 539, 17 A. Ikem, N. O. Egiebor, K. Nyavor, *Water Air. Soil Pollut.,* 2003, 149, 51.

18 J. Majzlan, C. N. Alpers, C. B. Koch, R. B. McCleskey, S. C. B. Myneni, J. M. Neil, *Chem. Geol.,* 2011, 284, 296.

19 M. Karabulut, et al. *Non-Cryst. Solids,* 2002, 306, 182.

20 C. Reimann, K. Bjorvatn, B. Frengstad, Z. Melaku, R. Tekle-Haimanot, J. Siewers, *Sci. Total Environ.,* 2003, 311, 65.

21 M. Berg, P. T. K. Trang, C. Stengel, J. Buschmann, P. H. Viet, N. Van Dan, W. Giger, D. Stilben, *Chem. Geol.* 2008, 249, 91.

22 J. Buschmann, M. Berg, C. Stengel, L. Winkel, M. L. Sampson, P. T. K. Trang, P. H. Viet, *Environ. Int.,* 2008, 34, 756.

23 P, A. Gyles, A. Miller, *Environ. Earth Sci.,* 2011, 62, 1431.

24 T. D. Waite, *Environ. Sci. Biotech.* 2002, 1, 9.

25 O. M. Yaghi, G. Li, R. Li, *Nature,* 1995, 378, 703.

26 J. X. Jiang, et al., *Angew. Chem. Int. Ed.,* 2007, 46, 8574.

27 A. A. Adeyemo, I. O. Adeoye, O. S. Bello, *Toxicol. Environ. Chem.,* 2012, 94, 1846.

28 M, Carboni, C. W. Abney, S. Liu, W. Lin, *Chem. Sci.,* 2013, 4, 2396.

29 X. Liu, N. K. Demir, Z. Wu, K. Li, *J. Am. Chem. Soc.,* 2015, 137, 6999.

30 C. Wang, X. Liu, N. K. Demir, J. P. Chen, K. Li, *Chem. Soc. Rev.,* 2016, 45, 5107.

31 Y. Zhang, S. Yuan, X. Feng, H. Li, J. Zhou, B. Wang, *J. Am. Chem. Soc.,* 2016, 138, 5785.

32 S. Y. Ding, M. Dong, Y. W. Wang, Y. T. Chen, H. Z. Wang, C. Y. Su, W. Wang, *J. Am. Chem. Soc.,* 2016, 13, 3031.

33 S. A. Sapchenko, P. A. Demakov, D. G. Samsonenko, D. N. Dybtsev, M. Schroder, V. P. Fedin, *Chem. Eur. J.,* 2017, 23, 2286.

34 P. Z. Li, J. Su, J. Liang, J. Liu, Y. Zhang R. Chen, Y. Zhao, *Chem. Commun.,* 2017, 53, 3434.

35 N. S. Bobbin, M. L. Mendonca, A. J. Howarth, T. Istamoglu, J. T. Rupp, O. K. Farha, R. Q. Snurr, *Chem. Soc. Rev.,* 2017, 46, 3357.

36 D. T. Sun, L. Peng, W. S. Reeder, S. M. Moosavi, D. Tian, D. K, Britt, E. Oveisi, W. L. Queen, *ACS Cent. Sci.,* 2018, 4, 349.

37 Y. Yuan, G. Zhu, *ACS Cent. Sci.,* DOI:10.1021/acscentsci.9b00047

38 T. Ben, H. Ren, M. Shengqian, D. Cao, J. Lan, X. Jing, W. Wang, J. Xu F. Deng, J. M. Simmons, S. Qiu, G. Zhu, *Angew. Chem. Int. Ed.,* 2009, 48, 9457.

39 W. Lu, D. Yuan, J. Sculley, D. Zhao, R. Krishna, H. C, Zhou, J. Am. Chem. Soc., 2011, 133, 18126.

40 B. Li, Y. Zhang, D. Ma, Z. Shi, S. Ma, *Nat. Commun.,* 2014, 5, 5537.

41 J. F. Van Humbeck, T. M. McDonald, X. Jing, B. M. Wiers, G. Zhu, J. R. Long, *J. Am. Chem. Soc.,* 2014, 136, 2432.

42 S. Lee, G. Barin, C. M. Ackerman, A. Muchenditsi, J. Xu, J. A. Reimer, S. Lutsenko, R. Long, C. J. Chang, *J. Am. Chem, Soc.,* 2016, 138, 7603.

43 S. Demir, N, K. Brune, j..F, Van Humbeck J. A. Mason, T. V. Pia,khova, S. Wang, G, Tian, S. G. Minasian, T. Tyliszczak, T. Yaita, T. Kobayashi, S. N. Kaimykov, H. Shiwaku, D. K. Shuh, J. R. Long, *ACS Cent. Sci.,* 2016, 2, 253.

44 H. W. Long, H. C. Gaede, J. Shore, L. Revert, C. R. Bowers, J. Kritzenberger, T. Pietrass, A. Pines, P. Tang, and J. A. Reimer, *Am. Chem. Soc.,* 1993, 115, 8491.

45 B. Ravel, M. Newville, *J Synchrotron Radiat.,* 2005, 12, 537.

46 S. I. Zabinsky, et al, *Phys Rev. B,* 1995, 52, 2995.

47 D. W. Domaine, E. L. Que, C, J. Chang, *Nat. Chem. Biol.,* 2008, 4, 168.

48 H. Au-Yeung, J. Chan, I. Chantarojsiri, C. J. Chang, *J. Am. Chem, Soc.,* 2013, 135, 15165.

49 A. T. Aron, K. M. Ramos-Torres, J. A. Cotruvo, C. J. Chang, *Acc. Chem. Res,,* 2015, 48, 2434, 50 A, T. Aron, M. O. Loehr, J. Bogena, C. J. Chang, *J Am. Chem. Soc.,* 2016, 138, 14338.

51 A. T. Aron, et al. , *Proc. Natl. Acad. Sci.,* 2017, 114, 12669.

52 A. T. Aron, A. G. Reeves, C. J. Chang, *Curr. Opin. Chem. Biol.,* 2018, 43, 113.

53 G. Serratrice, et al, *Inorg. Chem.,* 1997, 36, 3898.

54 Y. Yang, H. Ding, S. Hao, Y. Zhang, Q. Kan, *Appl. Organomet. Chem.,* 2011, 25, 262.

55 R. Mladenova, et al , *Eur. Polym. J.* 2002, 38, 989.

56 S. Goswami, K. Aich, A. Kumar Das, A. Manna, S, Das, *RSC Adv.,* 2013, 3, 2412.

57 B. K. Teo, EXAFS: Basic Principles and Data Analysis, *Inorganic Chemistry Concepts*, Springer-Verlag: Berlin Heidelberg, 1986.

58 C. P. Grey, N. Dupré, *Chem. Rev.,* 2004, 104, 4493.

59 P, M. Aguiar, et al, *Phys. Chem. Chem. Phys.,* 2009, 11, 6925.

60 A. J. Pell, G. Pintacuda, C. P. Grey, *Prog. Nucl. Magn. Resort. Specirosc.,* 2018.

61 C. Delaire, et al, *J. Environ. Technol.,* 2015, 49, 9945.

62 Y. Chen, et al. *Angew. Chem. Int. Ed.,* 2013, 52, 1688.

63 X. Ding, L. Qu, R. Yang, Y. Thou, J. Li, *Luminescence,* 2014, 30, 465.

64. D. Zhu, L. Xue, G. Li, Y. Che, H. Jiang, *Org. Chem. Front.,* 2014, 1, 501.

The invention claimed is:

1. An ether-thioether functionalized porous aromatic framework polymer with selectivity for iron(III) and iron (III) adsorption in aqueous samples.

2. The polymer of claim 1, wherein the ether-thioether functionalized porous aromatic framework is of formula: (2-(methylthio)ethoxy)methyl-PAF ($CH_3SCH_2CH_2OCH_2$-PAF or PAF-$CH_2OCH_2CH_2SCH_3$).

3. The polymer of claim 1, wherein the ether-thioether functionalized porous aromatic framework comprises carbon atoms tetrahedrally connected to four neighboring carbon atoms though two phenyl rings.

4. The polymer of claim 1, synthesized using a nickel(0)-catalyzed cross-coupling reaction to couple the phenyl rings to a tetrakis(4-bromophenyl)methane a tetrahedral building unit.

5. The polymer of claim 1 which exhibits selectivity for the adsorption of iron(II) and iron(III) ions over other biologically-relevant metal ions at initial concentrations of 0.3, 2, 10 or 20 mg/L.

6. The polymer of claim 1, wherein the ether-thioether functionalized porous aromatic framework comprises monomer units of one of formulas (I), (II), (III) or (IV):

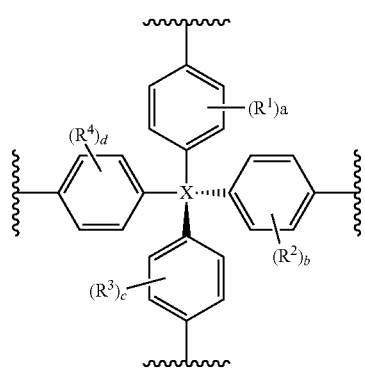
(I)

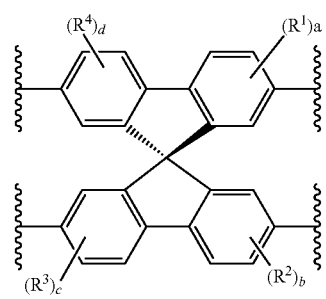
(II)

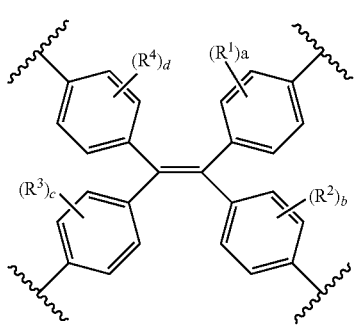
(III)

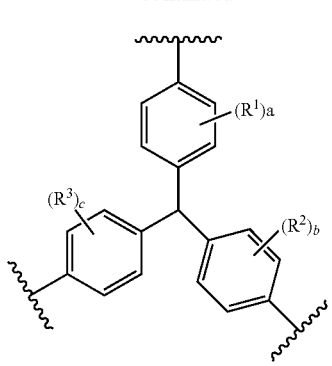
(IV)

wherein,

X is selected from C, Si, and a three-dimensional polycyclic cycloalkyl moiety, $R^1$, $R^2$, $R^3$ and $R^4$ are independently selected from an ether-thioether, and the indeces a, b, c and d are members independently selected from the integers 1, 2, 3, and 4, such that when a, b, c, or d is greater than 1, each $R^1$, $R^2$, $R^3$ and $R^4$, respectively, is independently selected.

7. The polymer of claim 1, wherein the ether-thioether functionalized porous aromatic framework comprises monomer units of formula (I):

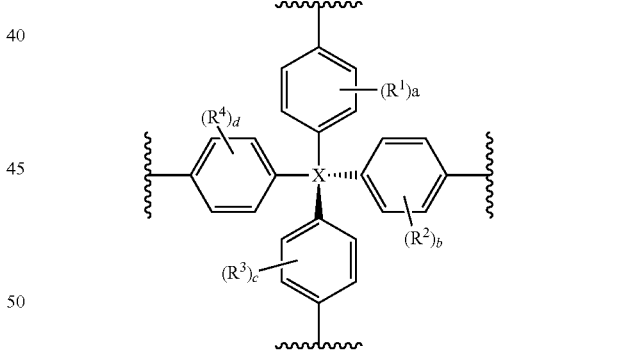
(I)

wherein,

X is selected from C, Si, and a three-dimensional polycyclic cycloalkyl moiety, $R^1$, $R^2$, $R^3$ and $R^4$ are independently selected from an ether-thioether, and the indeces a, b, c and d are members independently selected from the integers 1, 2, 3, and 4, such that when a, b, c, or d is greater than 1, each $R^1$, $R^2$, $R^3$ and $R^4$, respectively, is independently selected.

8. The polymer of claim 1, wherein the ether-thioether functionalized porous aromatic framework comprises monomer units of formula:

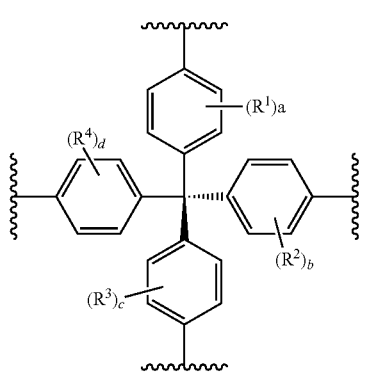

wherein,

R$^1$, R$^2$, R$^3$ and R$^4$ are independently selected from an ether-thioether, and the indeces a, b, c and d are members independently selected from the integers 1, 2, 3, and 4, such that when a, b, c, or d is greater than 1, each R$^1$, R$^2$, R$^3$ and R$^4$, respectively, is independently selected.

9. The polymer of claim 1, wherein the ether-thioether functionalized porous aromatic framework comprises monomer units of formula:

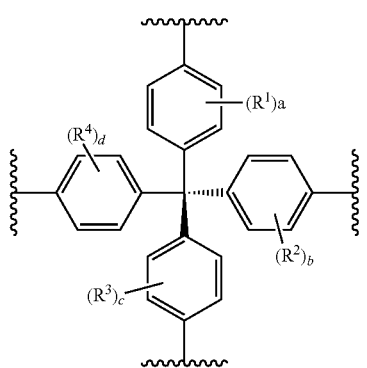

wherein,

R$^1$, R$^2$, R$^3$ and R$^4$ are 2-(methylthio)ethoxy)methyl, and the indeces a, b, c and d are members independently selected from the integers 1, 2, 3, and 4, such that when a, b, c, or d is greater than 1, each R$^1$, R$^2$, R$^3$ and R$^4$, respectively, is independently selected.

10. The polymer of claim 1, wherein the ether-thioether functionalized porous aromatic framework comprises monomer units of formula:

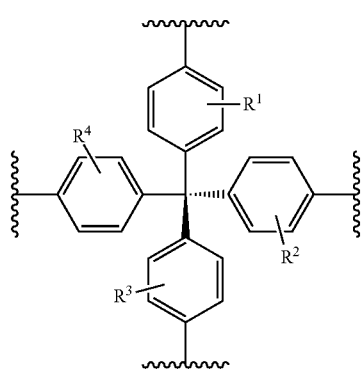

wherein,

R$^1$, R$^2$, R$^3$ and R$^4$ are 2-(methylthio)ethoxy)methyl.

11. A composition comprising the polymer of a claim 1, combined with an 8-hydroxyquinoline colorimetric indicator.

12. A method of making the polymer of a claim 1, comprising the step of reacting a chloromethyl functionalized porous aromatic porous aromatic framework with 2-(methylthio)ethan-1-ol to obtain the ether-thioether functionalized porous aromatic porous aromatic framework.

13. A method of using the polymer of claim 1, comprising absorbing to the polymer iron ions from a water sample.

14. A method of detecting iron in a sample comprising absorbing to the polymer of claim 1 iron ions of the sample.

15. A method of removing iron from a sample comprising absorbing to the polymer of claim 1 iron ions of the sample, and separating the iron ions from the sample.

\* \* \* \* \*